United States Patent
Leme et al.

(10) Patent No.: US 11,151,311 B2
(45) Date of Patent: Oct. 19, 2021

(54) SYSTEMS AND METHODS FOR AUTOFILL FIELD CLASSIFICATION

(71) Applicant: Google LLC, Mountain View, CA (US)

(72) Inventors: Felipe Leme, Belmont, CA (US); Jason Long, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/963,730

(22) PCT Filed: Mar. 4, 2019

(86) PCT No.: PCT/US2019/020615
§ 371 (c)(1),
(2) Date: Jul. 21, 2020

(87) PCT Pub. No.: WO2019/173244
PCT Pub. Date: Sep. 12, 2019

(65) Prior Publication Data
US 2021/0027013 A1    Jan. 28, 2021

Related U.S. Application Data

(60) Provisional application No. 62/639,471, filed on Mar. 6, 2018.

(51) Int. Cl.
*G06F 40/174* (2020.01)
*G06F 16/9535* (2019.01)

(52) U.S. Cl.
CPC ........ *G06F 40/174* (2020.01); *G06F 16/9535* (2019.01)

(58) Field of Classification Search
None
See application file for complete search history.

(56) References Cited

U.S. PATENT DOCUMENTS

| 5,845,300 | A  | * | 12/1998 | Comer   | G06F 40/18  |
|           |    |   |         |         | 715/203     |
| 6,651,217 | B1 | * | 11/2003 | Kennedy | G06F 40/174 |
|           |    |   |         |         | 715/224     |
| 8,234,561 | B1 | * | 7/2012  | Bourdev | G06F 40/174 |
|           |    |   |         |         | 715/224     |
| 8,522,257 | B2 | * | 8/2013  | Rupp    | G06F 11/302 |
|           |    |   |         |         | 719/318     |
| 9,547,420 | B1 | * | 1/2017  | Cassidy | G06F 3/0237 |
| 10,169,321| B2 | * | 1/2019  | Trivedi | G06Q 20/12  |

(Continued)

*Primary Examiner* — Stella Higgs
(74) *Attorney, Agent, or Firm* — McDonnell Boehnen Hulbert & Berghoff LLP

(57) ABSTRACT

An example method includes determining a subset of content excluding user-specific information displayed by an application on a user interface (UI) of a user device. The method further includes transmitting a request to a remote provider an autofill request for the application. The method also includes receiving one or more suggested user values and a field classification request for a text input field displayed by the application on the UI. The method further includes detecting a user input value in the text input field and determining a similarity metric for each of the one or more suggested user values based on a comparison of the user input value to each of the one or more suggested user values. The method also includes transmitting a response to the field classification request to the remote provide comprising the similarity metric for at least one of the one or more suggested user values.

21 Claims, 8 Drawing Sheets

(56) References Cited

U.S. PATENT DOCUMENTS

| | | | |
|---|---|---|---|
| 10,635,748 B2* | 4/2020 | Liu | G06F 3/048 |
| 10,943,063 B1* | 3/2021 | Mccown | H04L 67/306 |
| 2002/0062342 A1* | 5/2002 | Sidles | H04L 67/2804 709/203 |
| 2005/0257148 A1* | 11/2005 | Goodman | G06F 40/174 715/226 |
| 2005/0283468 A1* | 12/2005 | Kamvar | G06F 16/3325 |
| 2008/0184100 A1* | 7/2008 | Selig | G06F 40/174 715/225 |
| 2008/0235567 A1* | 9/2008 | Raj | G06F 40/174 715/226 |
| 2013/0091411 A1* | 4/2013 | Rampson | G06F 40/166 715/224 |
| 2013/0104022 A1* | 4/2013 | Coon | G06F 40/174 715/226 |
| 2013/0226921 A1* | 8/2013 | Eliassaf | G06K 9/6218 707/737 |
| 2014/0258828 A1* | 9/2014 | Lymer | G06F 40/174 715/224 |
| 2014/0372861 A1* | 12/2014 | Lawless | G06F 40/174 715/224 |
| 2014/0372933 A1* | 12/2014 | Shirolkar | G06F 40/274 715/780 |
| 2015/0205776 A1* | 7/2015 | Bhatia | G06F 40/14 715/226 |
| 2016/0092557 A1* | 3/2016 | Stojanovic | G06F 16/254 707/723 |
| 2017/0046622 A1* | 2/2017 | Gaither | G06F 40/247 |
| 2017/0075873 A1* | 3/2017 | Shetty | G06F 3/0481 |
| 2017/0322920 A1* | 11/2017 | Meschkat | G06Q 50/12 |
| 2017/0357627 A1* | 12/2017 | Peterson | G06F 7/023 |
| 2018/0018741 A1 | 1/2018 | Mukherjee et al. | |
| 2018/0260086 A1* | 9/2018 | Leme | G06F 40/174 |
| 2019/0296983 A1* | 9/2019 | Clark | H04L 41/0869 |
| 2019/0354625 A1* | 11/2019 | Toudji | G06F 16/248 |
| 2021/0056148 A1* | 2/2021 | Smit | G06F 16/9538 |

* cited by examiner

SYSTEMS AND METHODS FOR AUTOFILL FIELD CLASSIFICATION

CROSS REFERENCE TO RELATED APPLICATION

The present application is a national stage application under 35 U.S.C. § 371 of International Application No. PCT/US2019/020615 filed on Mar. 4, 2019, which claims priority to U.S. Provisional Patent Application Ser. No. 62/639,471 filed on Mar. 6, 2018, the entire contents of each of which are incorporated herein by reference, as if fully set forth in this description.

BACKGROUND

Many modern computing devices, including mobile devices, mobile phones, personal computers, and tablets, provide user interfaces (UIs) for permitting users to interact with the computing device. For example, application programs can use the UI to communicate with a user using images, text, and graphical elements such as windows, dialogs, pop-ups, images, buttons, scrollbars, and icons. The UI can also receive inputs from devices such as touch screens, a presence-sensitive display, computer mice, keyboards, and other devices to permit the user to control the UI, and thus the application program.

In some cases, the UI can be used to interact with an operating system to manage the computing device. For example, the operating system can have a control panel or setting application that uses the UI to draw one or more windows related to control settings for some aspect(s) of the computing device, such as audio controls, video outputs, computer memory, and human language(s) used by the operating system (e.g., choose to receive information in English, French, Mandarin, Hindi, Russian, etc.). The control panel/settings application can receive subsequent input related to the window(s) using the UI. The UI can provide the inputs to the operating system, via the control panel/settings application, to manage the computing device.

However, manually entering data into a UI can be inconvenient, slow and/or cumbersome for users or may generate errors, especially on mobile devices that may have a small UI.

SUMMARY

Example embodiments relate to a system that allows an operating system of a user device to provide autofill data for applications with the help of a remote provider based on crowdsourcing and scoring user-inputted data without storing the user-inputted data on the user device. More specifically, realizing that the user may input sensitive or confidential information, the operating system of a user device may determine a subset of content displayed by an application on a user interface (UI) of the user device that excludes specific information specific to that user. Then, in a further aspect, the operating system may use this subset of content to generate and transmit an autofill request to a remote provider for the application. Additionally, based on this request, the operating system may receive a response from the remote provider that contains at least one or more suggested user values and a field classification request for a text input field displayed by the application on the UI. Furthermore, the operating system may also detect a user input in the text input field and, in response to detecting the user input value in the text input field, determine a similarity metric for each of the one or more suggested user values based on a comparison of the user input value to each of the one or more suggested user values. In yet another aspect, the operating system may transmit a response to the field classification request to the remote provider, wherein the response comprises the similarity metric for at least one of the one or more suggested values.

In one aspect, a method is provided that includes determining a subset of content displayed by an application on a user interface (UI) of a user device, wherein the subset excludes user-specific information. The method further includes transmitting, to a remote provider, an autofill request for the application, wherein the autofill request comprises the subset of content displayed on the UI. The method also includes receiving, from the remote provider in response to the autofill request, one or more suggested user values and a field classification request for a text input field displayed by the application on the UI. The method additionally includes detecting a user input value in the text input field. The method further includes, in response to detecting the user input value in the text input field, determining a similarity metric for each of the one or more suggested user values based on a comparison of the user input value to each of the one or more suggested user values. The method also includes transmitting a response to the field classification request to the remote provider, wherein the response comprises the similarity metric for at least one of the one or more suggested user values.

In another aspect, a user device is provided. The user device includes a UI and an operating system configured to determine a subset of content displayed by an application on the UI of the user device, wherein the subset excludes user-specific information. The operating system is further configured to transmit, to a remote provider, an autofill request for the application, wherein the autofill request comprises the subset of content displayed on the UI. The operating system is also configured to receive, from the remote provider in response to the autofill request, one or more suggested user values and a field classification request for a text input field displayed by the application on the UI. The operating system is additionally configured to detect a user input value in the text input field. The operating system is further configured to generate, in response to detecting the user input value in the text input field, determine a similarity metric for each of the one or more suggested user values based on a comparison of the user input value to each of the one or more suggested user values. The operating system is also configured to transmit a response to the field classification request to the remote provider, wherein the response comprises the similarity metric for at least one of the one or more suggested user values.

In another aspect, a non-transitory computer readable medium is provided having stored therein instructions executable by one or more processors to cause an operating system of a user device to perform functions. The functions include determining a subset of content displayed by an application on a user interface (UI) of a user device, wherein the subset excludes user-specific information. These functions also include transmitting, to a remote provider, an autofill request for the application, wherein the autofill request comprises the subset of content displayed on the UI. These functions additionally include from the remote provider in response to the autofill request, one or more suggested user values and a field classification request for a text input field displayed by the application on the UI. These functions also include detecting a user input value in the text input field. These functions further include, in response to detecting the user input value in the text input field, determining a similarity metric for each of the one or more suggested user values based on a comparison of the user input value to each of the one or more suggested user values. These functions additionally include transmitting a response to the field classification request to the remote provider, wherein the response comprises the similarity metric for at least one of the one or more suggested user values.

In another aspect, a system is provided that includes a UI, at least one processor, and a non-transitory computer readable medium having stored therein instructions (that when executed by the at least one processor, cause the at least one processor to perform functions). The system includes means for determining a subset of content displayed by an application on a user interface (UI) of a user device, wherein the subset excludes user-specific information. The system further includes means for transmitting, to a remote provider, an autofill request for the application, wherein the autofill request comprises the subset of content displayed on the UI. The system also includes means for receiving, from the remote provider in response to the autofill request, one or more suggested user values and a field classification request for a text input field displayed by the application on the UI. The system additionally includes means for detecting a user input value in the text input field. The system further includes, in response to detecting the user input value in the text input field, determining a similarity metric for each of the one or more suggested user values based on a comparison of the user input value to each of the one or more suggested user values. The system also includes transmitting a response to the field classification request to the remote provider, wherein the response comprises the similarity metric for at least one of the one or more suggested user values.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
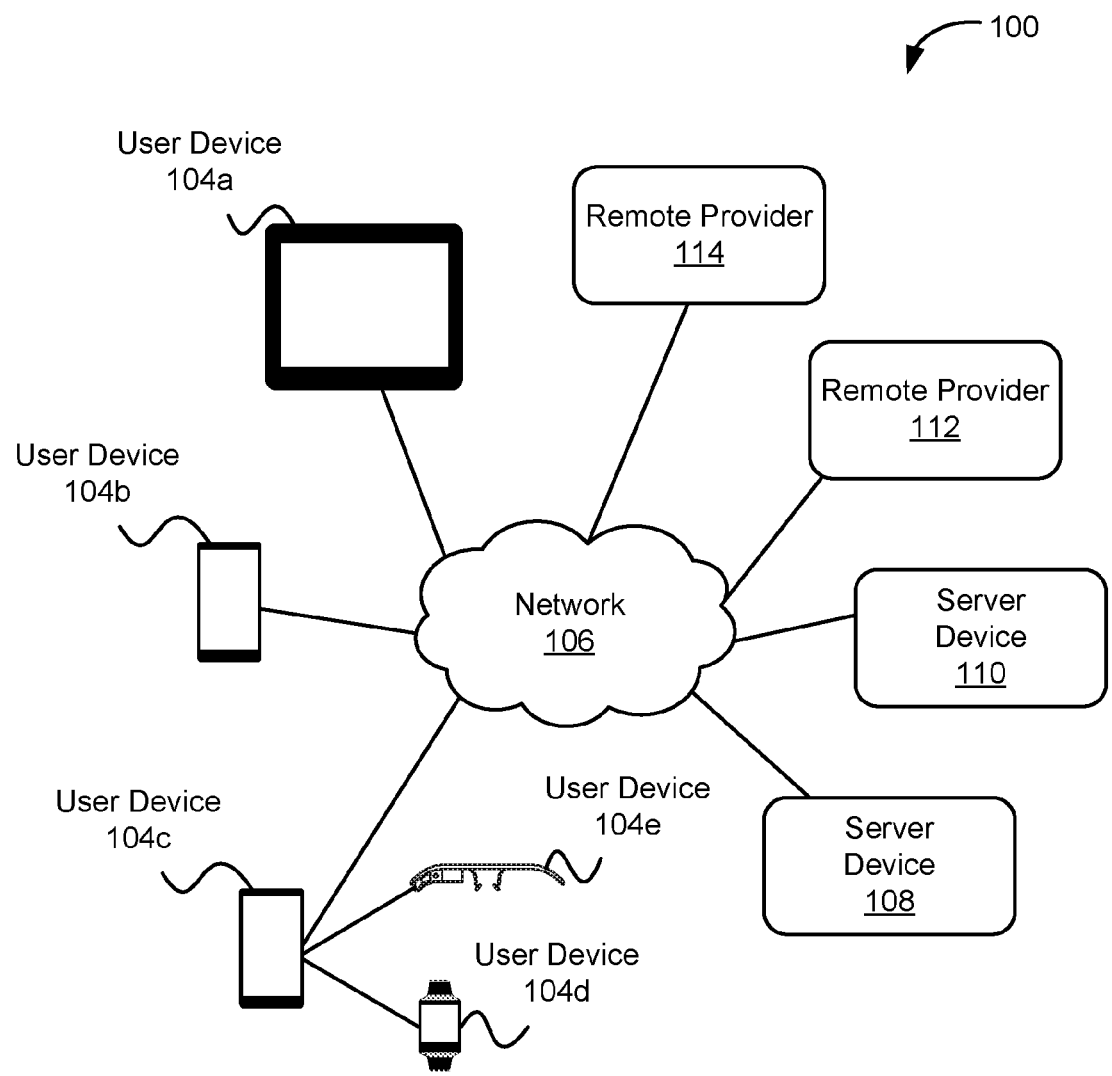
FIG. 1 depicts a distributed computing architecture, in accordance with example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

It will be readily understood that the aspects of the present disclosure, as generally described herein, and illustrated in the Figures, can be arranged, substituted, combined, separated, and designed in a wide variety of different configurations, all of which are contemplated herein.

I. Overview

User devices, including mobile devices, mobile phones, personal computers, and tablets, are ubiquitous in modern communication networks. Many of these devices are capable of running one or more applications while facilitating communication within such networks. Further, many of these devices also provide one or more UIs for permitting users to interact with the user device.

For example, a user may use a UI to communicate information to be used by an application on the user device through the use of images, text, and other graphical elements. The UI can also receive inputs from numerous devices connected to the user device, such as touch screens, a presence-sensitive display, computer mice, keyboards, and other devices that permit the user to control the UI, and thus the application.

In an optimal scenario, the user would be able to effectively and efficiently use the UI to communicate such information; however, one or more factors may impose a limitation on the user's ability to do so. Thus, if operating under such a limitation, as the need to communicate more and more information grows, the ability to communicate this information effectively and efficiently may become restricted.

By way of example, for user devices with small screens, typing extensive amounts of text into the UI to communicate information to be used by an application may be very difficult, especially if the text is also difficult for the user to remember. Accordingly, it may be advantageous for the application to be able to remember this information as it would not have to be re-communicated the next time the application was to be employed by the user. It is plausible, however, that as the number of applications with which a user attempts to communicate grows, the burden imposed by using the UI to communicate extensive amounts of text to each of these applications (for the first time or otherwise) may burden the user. And, this may be true even if individual applications remember information entered by the user. As a result, users may become less engaged with these applications (or abandon their use altogether) once prompted to enter such information.

Some of these problems may be addressed through the use of methods, systems, and devices that allow the user of the user device to effectively and efficiently communicate information to be used by such applications by engaging the operating system of the user device to serve as an intermediary to facilitate autofill across multiple applications with the help of a remote provider. Specifically, in some examples, a user may use autofill at the operating system level of the user device by, in part, enabling autofill, allowing an authorized remote provider to provide data for autofill, retrieving autofill data, and saving autofill data for future use.

However, some users may become frustrated or fatigued by constant interaction with autofill suggestions or requests to engage in autofill by the operating system or remote providers. This problem may be further heightened if the autofill suggestions provided to the user are incorrect or are incorrectly placed, particularly if the user has interacted with autofill processes and autofill remote providers before. Thus, in an ideal world, the autofill remote provider would know exactly where to autofill the user's data in the application displayed on the user's device.

Unfortunately, most operating systems, applications, and autofill remote providers do not operate this way, and instead can currently only rely on fairly unreliable options. In one example, these services may use heuristics and heuristic data to figure out the correct meaning of user inputted data and the text input fields into which the user inputs or should input this data (e.g., a remote provider could be looking for username or password substrings in a view's resource identifiers). But the problem with these heuristics and heuristic data is that they are unreliable and lead to the very problem the user is typically seeking to avoid: wasting more time and effort than if the user just manually entered the data. This inefficiency happens in a number of ways.

In one example, the user may spend time and effort correcting often incorrectly guessed autofill input data and text input fields (e.g., the remote provider sends autofill data for a username to a password field). In other example, the user may perceive that the operating system or remote provider do not detect any autofillable fields at all, which can also be incredibly frustrating for the user-particularly if they know one or more remote providers or inputted data for the application with which they are interacting have been saved before.

But, as detailed above, because the remote provider may not have access to the data the user may enter for future autofill uses until the user agrees to allow that data to be used for future autofill uses, it is difficult for the remote provider to provide the operating system with any insight or direction on the type, extent, and details of, or even how, the user-inputted data will be used for future autofill uses.

Furthermore, for security and/or other reasons, the operating system may not release user data from the application being autofilled to the remote provider (and vice-versa) without user consent. Thus, there is a direct need for an operating system to be able to dynamically interact with a remote provider to obtain intelligently suggested autofill data without giving away a user's specific information or bothering the user with repetitive or incorrect autofill prompts.

Disclosed herein are example embodiments relating to methods, systems, and devices that allow a user device to prompt a user with autofill data for applications with the help of a remote provider based on crowdsourcing and scoring user-inputted data without storing the user-inputted data on the user device, or compromising this data before the user consents. Specifically, example embodiments disclosed herein allow a user to be apprised, intelligently, of autofill data proposed for use by a remote provider without soliciting or otherwise bothering the user for consent or presenting hoards of options, which may be very difficult to comprehend or convey based on the reduced UI footprint of a mobile device. At the same time, there may be a need to treat specific information surrounding the user with the utmost care, confidentiality, and security.

In autofill solutions proposed herein, instead of arbitrarily sending the user's data to the autofill service or remote provider for crowdsourcing, these parties send suggested data to the operating system, and the operating system then confirms if the user entered that data. Put another way, at high level of approximation, an example embodiment may operate as such: (1) an operating system of a mobile device sends an autofill request to a remote provider based on a secure subset of content displayed on the UI of the mobile device; (2) the remote provider sends generic user data to the mobile device's operating system and marks a fill request as requiring field classification; (3) the operating system returns field classification results for further autofill uses based on similarity metrics to any data inputted by the user into the application.

In one example embodiment, an operating system may determine a subset of content displayed by an application on a user interface (UI) of a user device, wherein the subset excludes user-specific information. In particular, a user may be interacting with a computing device and decide to interact with an application on that device. The operating system may recognize that the user is interacting with an application and that there is content that the operating system knows is relevant to autofilling the application.

In general, the content displayed by an application on the UI refers to any information associated with an application that is ascertainable by the operating system. In one example, this content may include a current view hierarchy of the content displayed on the UI of the user device or contain information that is sensitive and/or private, the operating system determines only a subset of the content which excludes the user-specific information.

In a further aspect, the operating system may transmit, to a remote provider, an autofill request for the application, wherein the autofill request comprises the subset of content displayed on the UI. Specifically, based on the subset of displayed content excluding user-specific information, the operating system may send a request containing information within or associated with this subset of content to these remote providers to alert them of, amongst other things, potentially Tillable fields displayed on the UI. In any event, this request may be beneficial for the operating system and the user alike as it may allow the remote provider to securely and privately parse the content displayed on the UI to determine what information may be useful for facilitating autofill for the application (e.g., determining what text input fields on the application may be autofilled).

Either way, the operating system may also transmit an autofill request (comprising the subset of content displayed on the UI) for use with the application. In some examples, this request may be transmitted in response to an initiation of the application. In some examples, this request may be transmitted in response to a selection of a text input field of the application.

In yet another aspect, the operating system may receive, from the remote provider in response to the autofill request, one or more suggested user values and a field classification request for a text input field displayed by the application on the UI. In general, the response received from the remote provider may provide data that is helpful to the operating system and remote provider alike in facilitating autofill.

In one example, the response may contain data helpful to the operating system in facilitating autofill based on one more suggested user values the remote provider determines correlate to user values inputted by the user and/or autofilled in the application or other applications before. In this way, before the remote provider attempts to suggest autofill values to the user via the application and UI, the remote provider may provide suggested user values to the operating system in hopes that it will be able to accurately identify autofill text fields in the application without bothering or bogging down the user. But at the same time, the operating system may not want to be overwhelmed with any "brute force" attempts by the remote provider to identify the best ways to suggest autofill values to a user (e.g., by sending excessive amounts of suggested user values in the hopes that some will ultimately match the displayed text fields on the application, particularly when scaled over a lot of users). To combat this brute force attack, in example embodiments, the operating system could employ a number of tactics.

For example, the operating system could receive the suggested user values and/or field classification request from the remote provider via an interface (e.g., an application programming interface or API) that limits: (1) the total number of suggested user values received from the remote provider based on one more predetermined factors; (2) characteristics of the suggested user values themselves, based on one or more traits or characteristics of the suggested user values; (3) the overall number of field classification requests based on a predetermined maximum total number of field classification requests or the frequency at which they are received; (4) the number of user input fields for the field classification request based on a predetermined maximum number of user input fields; and/or (5) the number of field classification request for each text input field to a predetermined maximum per-field number of field classification requests (e.g., the interface would not allow any more than three field classification requests per text input field).

In addition to the suggested user values and field classification requests, the remote provider may provide additional information in response to the operating system's autofill request that is useful to the operating system in facilitating autofill. For example, in addition to the suggested user values and field classification requests, the remote provider may provide an autofill value for an additional text input field displayed by the application, where the additional text field is one that the remote provider has already successfully identified. In response, in some examples, the operating system may also cause the autofill value to be displayed in the additional text input field.

Under any of these scenarios, however, the remote provider may not comply with the expectations of the operating system or the limitations of the interface. And, doing either may lead the operating system to respond in a way that limits access by the remote provider. For example, the operating system may have a predetermined allocation of its resources devoted to the processes described herein, or any portion thereof, and, if the operating system determines that this predetermined resource allocation has been exceeded, then it may take ameliorative action (e.g., rejecting any further suggested user values or field classification requests from one or more remote providers).

In another aspect, the operating system may also detect a user input value in a text input field for which a field classification request has been received, and, in response, determine a similarity metric for each of the one or more suggested user values based on a comparison of the user input value to each of the one or more suggested user values. In some examples, this similarity metric may be reflected in a score generated based on how closely the user inputted value was to one or more of the suggested user values provided by the remote provider. Further, the methods underlying the computation of these similarity metrics (e.g., the underlying comparison models or algorithms) may vary (e.g., a string matching model or an edit distance model), and may even be dynamic (e.g., the underlying comparison model is updatable between autofill requests, maybe even obtained through a related or third-party source (e.g., Google Play Store)). And, these methods may be selectable by the remote provider (e.g., the operating system may transmit a list of underlying comparison models to the remote provider and, based on the remote provider's selected underlying comparison model, determine the similarity metric for each of the one or more suggested user values by applying the selected underlying comparison model) and/or set by default.

In yet another aspect, the operating system may transmit a response to the field classification request to the remote provider, wherein the response comprises the similarity metric for at least one of the one or more suggested user values. In some examples, this transmission of similarity metrics may be non-discerning (e.g., the operating system may generate similarity metrics for every suggested user value and transmit the similarity metrics for each of a plurality of suggested user values) or more targeted and analytical (e.g., the operating system may generate similarity metrics for every suggested user value, but only transmit the similarity metric for the best matching user value from a plurality of suggested user values). Either way, the similarity metrics may be used by the remote provider to better identify potentially autofillable fields of the application, allowing the remote provider to provide better autofill services when the application is run in the future by the same or a different user.

II. Distributed Computing Architecture

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

FIG. 1 depicts a distributed computing architecture 100 with server devices 108, 110 configured to communicate, via network 106, with user devices 104a, 104b, 104c, 104d, 104e, and remote providers 112 and 114, in accordance with example embodiments. Network 106 may correspond to a local area network (LAN), a wide area network (WAN), a corporate intranet, the public Internet, or any other type of network configured to provide communication paths between networked computing devices. Network 106 may also correspond to a combination of one or more LANs, WANs, corporate intranets, and/or the public Internet.

Although FIG. 1 only shows a small collection of user devices, distributed application architectures may serve tens, hundreds, or thousands of user devices. Moreover, user devices 104a, 104b, 104c, 104d, 104e (or any additional programmable devices) may be any sort of computing device capable of allowing a user to engage the operating system of the computing device to facilitate autofill across multiple applications with the help of a remote provider, such as an ordinary laptop computer, desktop computer, wearable computing device, mobile computing device, head-mountable device (HMD), network terminal, wireless communication device (e.g., a smartphone or cell phone), and so on. In some embodiments, such as indicated with user devices 104a, 104b, and 104c, user devices can be directly connected to network 106. In other embodiments, such as indicated with user devices 104d and 104e, user devices can be indirectly connected to network 106 via an associated computing device, such as user device 104c. In such embodiments, user device 104c can act as an associated computing device to pass electronic communications between user devices 104d and 104e and network 106. In still other embodiments not shown in FIG. 1, a user device can be both directly and indirectly connected to network 106.

Server devices 108, 110 may operate as part of a cloud-based server system that shares computer processing resources and data to computers and other devices on demand. In particular, server devices 108, 110 can be configured to perform one or more services requested by user devices 104a-104e. For example, server device 108 and/or 110 can provide content to user devices 104a-104e. In a further aspect, server device 108 and/or 110 may provide content to user devices 104a-104e directly or by facilitating the transmission of content requested from a third party. The content can include, but is not limited to, web pages, hypertext, scripts, binary data such as compiled software, images, audio, and/or video. The content can include compressed and/or uncompressed content. The content can be encrypted and/or unencrypted.

Remote providers 112, 114 may also operate as part of a cloud-based server system that shares computer processing resources and data to computers and other devices on demand. In particular, remote providers 112, 114 may provide, receive, store, manage, and transmit content on the network 106, in accordance with example embodiments. For example, remote provider 112 and/or 114 can receive a request for content to be used by user devices 104a-104e, and generate and transmit a response containing the content to devices connected to the network.

Within examples, server device 108 and/or 110 may provide content that facilitates autofill across multiple applications on user devices 104a-104e with the help of remote provider 112 and/or 114. Additionally, server device 108 and/or 110 can provide user devices 104a-104e with access to software for database, search, computation, graphical, audio, video, World Wide Web/Internet utilization, and/or other functions. Many other examples of content are possible as well.

III. Method Flowchart and Example Embodiments

Figure 2:
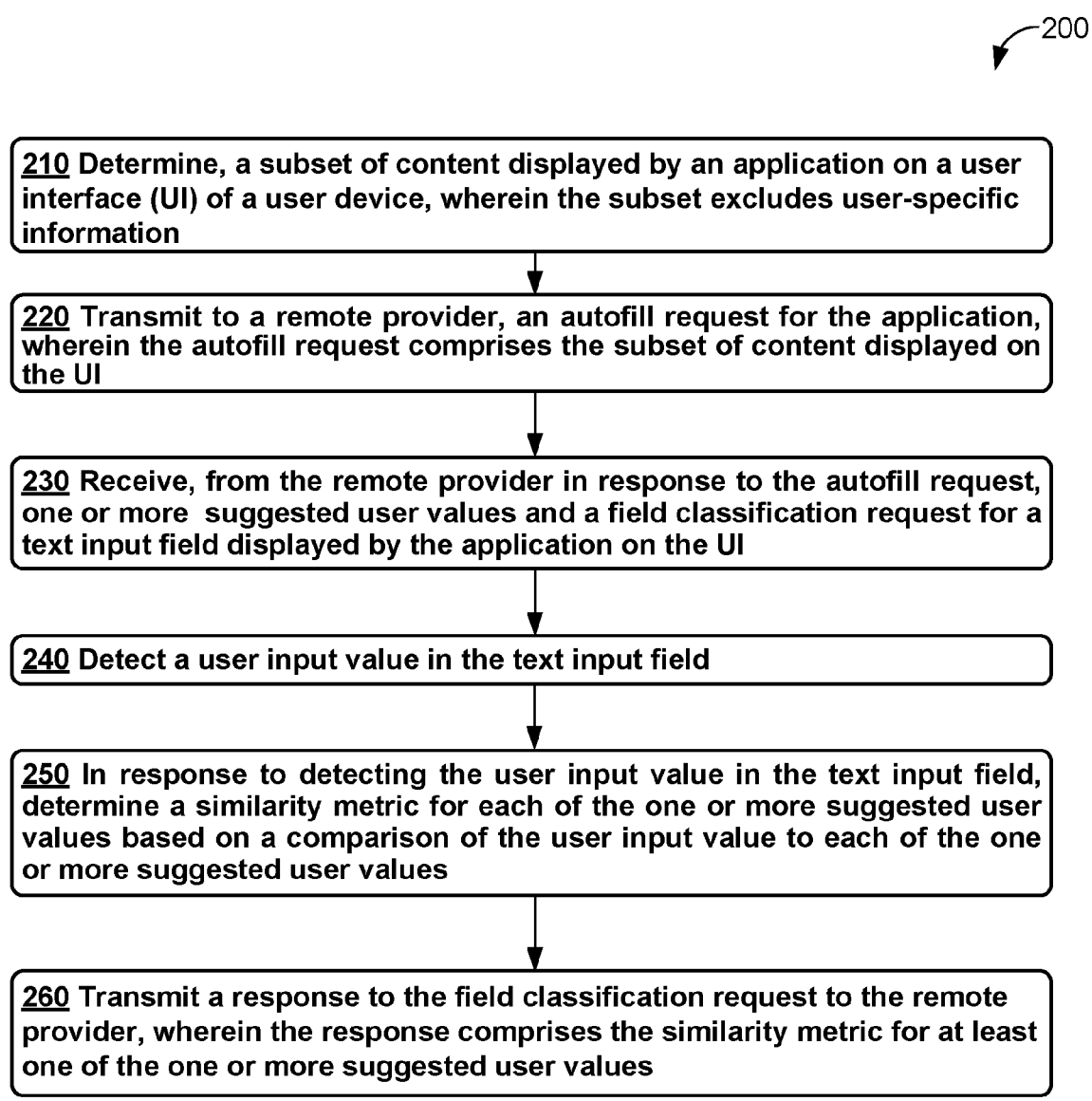
FIG. 2 is a flowchart of a method, in accordance with example embodiments.

FIG. 2 illustrates a flowchart showing a method 200 that may be performed to allow a remote provider to better provide autofill services for an application displayed by an operating system of a user device via the UI. Method 200 may be carried out by one or more computing devices, such as the user devices 104a-104e and remote provider 112 and/or 114, and in some instances server 108 and/or 110 as well, as illustrated and described with respect to FIG. 1. In additional examples, method 200 may be carried out by user devices 104a-104e and remote provider 112 and/or 114, and in some instances server 108 and/or 110 as well, operating as part of a cloud-based system. Additionally, method 200 may be performed by one or more other types of computing devices besides those specially illustrated in FIG. 1.

Additionally, although the steps of method 200 are described below as being completed by an operating system, other components, applications, and/or technologies related to the user device could perform the steps of method 200.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 2. Where used, program code can be stored on any type of computer-readable medium, for example, such as a storage device including a disk or hard drive.

In addition, each block of the flowchart shown in FIG. 2 may represent circuitry that is wired to perform the specific logical functions in the process. Unless specifically indicated, functions in the flowchart shown in FIG. 2 may be executed out of order from that shown or discussed, including substantially concurrent execution of separately described functions, or even in reverse order in some examples, depending on the functionality involved, so long as the overall functionality of the described method is maintained.

At block 210, method 200 may include determining a subset of content displayed by an application on a user interface (UI) of a user device, wherein the subset excludes user-specific information. In particular, a user may be interacting with a computing device and decide to interact with an application on that device. The operating system may recognize that the user is interacting with an application and that there is content that the operating system knows is relevant to autofilling the application.

In general, the operating system can recognize certain data that is commonly associated with autofill. In an example, the operating system may recognize that a text input field associated with an application contains or is associated with a common autofill descriptor (e.g., "Email" or "Username").

In one example, the operating system may begin determining a subset of content displayed by an application on the UI due to the triggering of an event, perhaps an autofill trigger event. Such events may provide information about the current state of the user device, or an application thereon, including the state of a user's interaction with the device. Autofill trigger events may also be used to help the operating system know when to engage in authorized autofill at the right points in time. In some examples, autofill triggers events may be direct or indirect user interactions with the device. In general, once autofill is approved by the user, however, user interaction with the device may be monitored by the operating system.

In one embodiment, example autofill trigger events may be indicated by data associated with direct user interaction with the user device, such as a user's initiation of an application or a user's selection of a text input field of an application, among other scenarios.

In other examples, the autofill trigger events may include data associated with indirect user interaction with the user device, such as a signal that an application has been initiated, or a signal that a text input field of the application, or some other parameter of content displayed on the UI of the user device, has focus, among other scenarios. In a further aspect, the user's indirect interaction with the user device may be reflected by a graphic or GUI, such as a keyboard, displayed on the UI.

In general, the content displayed by an application on the UI refers to any information associated with an application that is ascertainable by the operating system. In one example, this content may include a current view hierarchy of the content displayed on the UI of the user device. Because, however, the content may also contain information that is sensitive and/or private, the operating system determines only a subset of the content which excludes the user-specific information.

In some examples, the user-specific information may include personally identifiable information, or any other information that can be used on its own or with other information to identify, contact, or locate a single person, or to identify an individual in the context of other information or data. In additional examples, the user-specific information may include information that the user has designated as sensitive and/or private.

In still other examples, the user-specific information may include information that has been designated as sensitive and/or private based on one or more factors associated with the user. For example, the user-specific information may include information that has been designated as sensitive and/or private based on the geographical region in which the user, the user device, and/or the remote provider, is located, among other possibilities. In other examples, the user-specific information may include information that has been designated as sensitive and/or private based on an attribute of the user (e.g., the user's age).

At block 220, method 200 further includes transmitting, to a remote provider, an autofill request for the application, wherein the autofill request comprises the subset of content displayed on the UI. The request may be sent to a preselected remote provider to help facilitate the use of autofill on the user device or multiple remote provides with which the user may or may not have interacted before. Specifically, based on the subset of displayed content excluding user-specific information, the operating system may send a request containing information within or associated with this subset of content to these remote providers to alert them of, amongst other things, potentially Tillable fields displayed on the UI. In any event, this request may be beneficial for the operating system and the user alike as it may allow the remote provider to securely and privately parse the content displayed on the UI to determine what information may be useful for facilitating autofill for the application (e.g., determining what text input fields on the application may be autofilled).

In some examples, the request may include information associated with the text input fields displayed on the UI. In one aspect, this information may include one or more descriptors associated with the text input fields. For example, these descriptors may include terms such as "name," "username," "email," "password," "address," "city," "state," "zip code," "country," "account number," and/or "card number," among other possibilities.

In other examples, the request may include information associated with the current view hierarchy of the user device. In one aspect, this information may include information associated with compiling or maintaining the subset of content displayed on the UI (e.g., underlying script and/or code). In another aspect, this information may include information associated with certain approximations of the subset of content displayed on the UI (e.g, wireframe representations of the subset of content). In yet another aspect, this information may include information associated with the architecture of the subset of content displayed on the UI (e.g., information associated with the relative layout, linear layout, buttons, table layout, table rows, check boxes, and/or other elements).

Either way, the operating system may transmit an autofill request (comprising the subset of content displayed on the UI) for use with the application. In some examples, this request may be transmitted in response to an initiation of the application. In some examples, this request may be transmitted in response to a selection of a text input field of the application.

In still some other examples, this request may comprise metadata associated with the one or more text input fields. This metadata may be data or information that provides information about other data (e.g., descriptive metadata (which may describe a resource for purposes such as discovery and identification and can include elements such as title, abstract, author, and keywords), structural metadata (which may be about containers of data and indicates how compound objects are put together, for example, how pages are ordered to form chapters and describe the types, versions, relationships and other characteristics of digital materials and administrative metadata (which may provide information to help manage a resource, such as when and how it was created, file type and other technical information, and who can access it)).

At block 230, method 200 may further include receiving, from the remote provider in response to the autofill request, one or more suggested user values and a field classification request for a text input field displayed by the application on the UI. In general, the response received from the remote provider may provide data that is helpful to the operating system and remote provider alike in facilitating autofill.

In one example, the response may contain data helpful to the operating system in facilitating autofill based on one more suggested user values the remote provider believes correlate to user values inputted by the user and/or autofilled in the application or other applications before. In this way the remote provider may be providing suggested user values to the operating in hopes that it will be able to identify text input fields in the application so that the remote provider can autofill the input fields in the future without bothering the user or relying on the user's input before the remote provider attempts to suggest autofill values to the user via the application and UI.

At the same time, however, the operating system may not want to be overwhelmed with any "brute force" attempts by the remote provider to identify the best ways to suggest autofill values to a user by sending excessive amounts of suggested user values in the hopes that some will ultimately match the displayed text input fields on the application. To combat this brute force attack, the operating system could employee a number of tactics.

In one example, the operating system could receive the suggested user values from the remote provider via an interface that limits the total number of suggested user values received from the remote provider based on one more predetermined factors. For example, such an interface may limit the overall number of suggested user values based on a predetermined maximum total number of suggested user values (e.g., the interface would not allow any more than ten suggested user values from any one remote provider). In another example, the interface may limit the number of suggested user values for each text input field to a predetermined maximum per-field number of suggested user values (e.g., the interface would not allow any more than three suggested user values per text input field).

In yet other examples, the interface may limit characteristics of the suggested user values themselves, based on one or more traits or characteristics of the suggested user value. For example, the interface may limit each of the one or more suggested user values based on single characteristic (e.g., a predetermined minimum number of characters) or multiple characteristics (e.g., the interface could limit each of the one or more suggested user values to a first predetermined minimum number of characters if the suggested user value includes only numeric characters and to a second predetermined minimum number of characters if the suggested user value includes at least one non-numeric character).

Similar to the remote provider's suggested user values, the operating system may also want to limit the number or types of field classification requests received from the remote provider in response to the operating system's autofill requests. For example, the interface may limit the overall number of field classification requests based on a predetermined maximum total number of field classification requests (e.g., the interface would not allow any more than ten field classification requests from any one remote provider) or the frequency at which the remote provider is providing them (the interface would not allow any more than ten field classification requests per hour from any one remote provider).

In another example, the interface may limit the number of field classification requests based on the number of user input fields of an application (e.g., the interface would not allow any more than ten field classification request because there are only two user input fields). Similarly, the interface may also limit the number of field classification request for each text input field to a predetermined maximum per-field number of field classification requests (e.g., the interface would not allow any more than three field classification requests per text input field).

In addition to the suggested user values and field classification requests, the remote provider may provide additional information in response to the operating system's autofill request that is useful to the operating system in facilitating autofill. For example, in addition to the suggested user values and field classification requests, the remote provider may provide an autofill value for an additional text input field displayed by the application (e.g., the remote provider may know that it has some autofill value that can be suggested for autofill in a specific additional text input field with no further analysis). In response, in some examples, the operating system may also cause the autofill value to be displayed in the additional text input field.

Under any of these scenarios, however, the remote provider may not comply with the expectations of the operating system or the limitations of the interface, or both. And, doing so may lead the operating system to respond to limit access by the remote provider. For example, the operating system may have a predetermined allocation of its resources devoted to the processes described herein, or any portion thereof (e.g., the operating system may have a predetermined system resource allocation of 5% for receiving suggested user values and field classification requests from remote providers). Further, in some examples, if the operating system determines that this predetermined resource allocation has been exceeded, it may take ameliorative action (e.g., in response to determining its predetermined resource allocation of 5% has been exceeded, the operating system may refuse receipt of any further suggested user values or field classification requests from the remote providers).

At block 240, method 200 may further include detecting a user input value in the text input field. The user input value may be received over a period of time as the user enters (e.g., types) individual characters, numbers, or words. The operating system may also monitor text input fields for which a field classification request has been received in order to determine when the operating system can generate scoring metrics and provide a response to the field classification request.

At block 250, method 200 may further include, in response to detecting the user input value in the text input field, determining a similarity metric for each of the one or more suggested user values based on a comparison of the user input value to each of the one or more suggested user values.

In some examples, this similarity metric may be reflected in a score generated based on how closely the user inputted value was to one or more of the suggested user values provided by the remote provider (e.g., a score telling how accurate the match was, where the score is the highest score of all suggested user values associated with the text input field id). In other words, if one user inputted value completely matched (100%) a suggested user value corresponding to a first field classification request (e.g., with a suggested email value) and only partially matched (e.g., 40%) another suggested user value corresponding to a second field classification request (e.g., with a suggested username), then the similarity metric corresponding to the first field classification request may be viewed by the remoter provider as the superior match. The remote provider may therefore conclude that the field is more likely to be an email field than a username field.

Furthermore, the methods underlying the computation of these similarity metrics (e.g., the underlying comparison models or algorithms) may vary (e.g., a string matching model or an edit distance model). In a further aspect, these methods may even be dynamic (e.g., the underlying comparison model is updatable between autofill requests, maybe even obtained through a related or third-party source (e.g., Google Play Store)).

Additionally, these methods may also be selectable by the remote provider (e.g., the operating system may transmit a list of underlying comparison models to the remote provider and, based on the remote provider's selected underlying comparison model, determine the similarity metric for each of the one or more suggested user values by applying the selected underlying comparison model). In a further aspect, if not set, a default method (e.g., an algorithm) may be used by the operating system based on one or more factors (e.g., the most commonly used model may be one based on edit-distance, and thus it may be used as the default matching method).

At block 260, method 200 may further include transmitting a response to the field classification request to the remote provider, wherein the response comprises the similarity metric for at least one of the one or more suggested user values. In some examples, this transmission of similarity metrics may be non-discerning (e.g., the operating system generates a score for every suggested user value sent by the remote provider and transmits them back to the remote provider with no further analysis). Put another way, in some examples, the one or more suggested user values received from the remote provider may comprise a plurality of suggested user values, and, in response, the operating system may generate similarity metrics for every suggested user value and transmit the similarity metrics for each of the plurality of suggested user values. In some other examples, however, this transmission may be more targeted and analytical.

For example, in some embodiments, the one or more suggested user values received from the remote provider may comprise a plurality of suggested user values, and, in response, the operating system may generate similarity metrics for every suggested user value, but only transmit the similarity metric for the best matching user value from the plurality of suggested user values.

IV. Further Example Embodiments

In still other examples, the field classification request may indicate multiple text input fields. In some examples, the same set of suggested user values may be used to generate similarity metrics for each of the text input fields. The operating system may detect an additional user input value in the additional text input field. Then, in response to detecting the additional user input value in the additional text input field, the operating system may determine an additional similarity metric for each of the one or more suggested user values based on a comparison of the additional user input value to each of the one or more suggested user values. Additionally, the operating system may transmit an additional response to the remote provider, wherein the additional response comprises the additional similarity metric for at least one of the one or more suggested user values.

In other examples, a different set of suggested user values may be used to generate similarity metrics for each of the text input fields. The operating system receiving, from the remote provider in response to the autofill request, one or more additional suggested values, wherein the one or more additional suggested values are different than the one or more suggested user values. In a further aspect, the operating system may also detect an additional user input value in the additional text input field. Then, in response to detecting the additional user input value in the additional text input field, the operating system may determine an additional similarity metric for each of the one or more additional suggested values based on a comparison of the additional user input value to each of the one or more additional suggested values. In yet a further aspect, the operating system may also transmit an additional response to the remote provider, wherein the additional response comprises the additional similarity metric for at least one of the one or more additional suggested values.

V. Additional Explanatory Figures and Example Embodiments

Figure 3A:
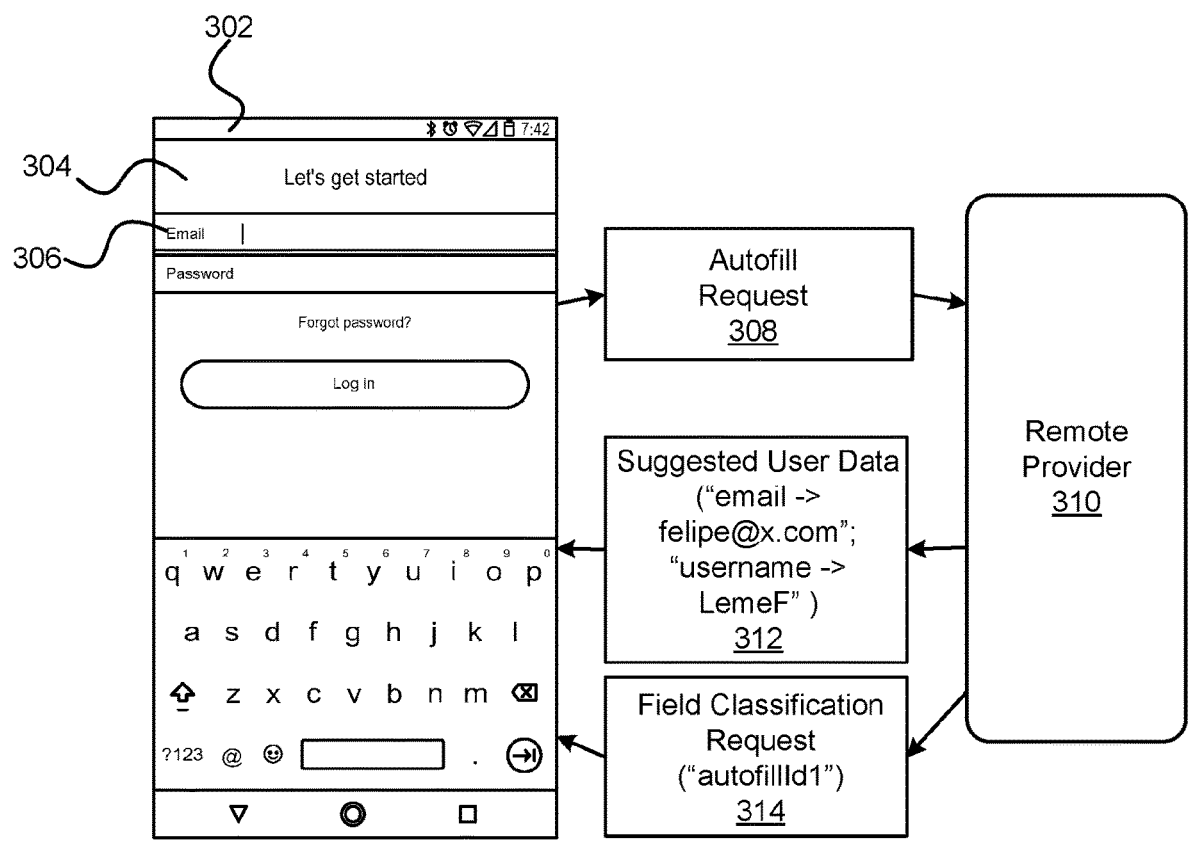
FIG. 3A shows an operating system of a first device sending an autofill request to a remote provider and receiving suggested user data and a field classification request from the remote provider, in accordance with example embodiments.

FIG. 3A, based on a first user's interaction with an application on a first mobile device, shows an operating system sending an autofill request to a remote provider and receiving one or more suggested user values and a field classification request from the remote provider, in accordance with example embodiments. In particular, a user device 302 such as a cellular phone may display a portion of application 304 on the user device. The application 304 may also include text input fields containing or associated with a common autofill descriptor 306 (e.g., "Email") displayed on the UI of user device 302. In this example, once the operating system of the user device 302 recognizes the common autofill descriptor 306, the operating system may send an autofill request 308 to a remote provider 310.

Additionally in this example, as described above, this autofill request 308 may be in response to a text input field of the application having some focus (here, the "Email" text input field has a vertical line indicating text can be typed into the field via the displayed keyboard) and/or those without such focus (here, the "Password" text input field has no such vertical line).

Under either of these scenarios, however, before the operating system sends such an autofill request, it determines a subset of the content displayed on the UI that excludes user-specific information. Once this subset is determined by the operating system, and some event has triggered the operating to generate and transmit an autofill request, the operating system generates and transmits this autofill request (illustrated here as autofill request 308, and comprising the subset of content displayed on the UI) to the remote provider.

Once the remote provider receives the autofill request, it in turn may provide at least two pieces of information to the operating system: (1) suggested user data 312 (including suggested user values "felipe@x.com" and "LemeF"); and (2) a field classification request 314 (shown here as "autofillId1").

Concerning the first point, one or more suggested user values may be provided by the remote provider as data that may be relevant to autofilling the application for which the operating system sent autofill request 308. Again, in this example, the two suggested user values are shown as "felipe@x.com" and "LemeF".

In the context of this embodiment, previously entered suggested user data 312 may be defined by a UserData object and may include an id and a map of field_id→list_of_values pairs, where id identifies the whole user data (so it can be used for versioning), field_id represents a field type, and list_of_values is a list of user input values associated with that field. In this example, field_id "email" is mapped to value "felipe@x.com" and field_id "username" is mapped to "LemeF".

Also in the context of this embodiment, both id and field_id may be arbitrary values set by the remote provider and treated as black boxes by the operating system, but they may also contain meaningful values to help debug these processes. For example, if containing such values, the operating system may analyze this process via the illustrative code below:

```
autofillManager.setUserData(new UserData.Builder("v1")
    .add("email", "felipe@x.com")
    .add("username", "LemeF")
    .build( ));
```

Further, in some embodiments the UserData may be a cached object that is associated with the remote provider, so it may be used in multiple requests. In a further aspect, because there may be one or more reasons to choose otherwise (e.g., for security purposes), the UserData may not be persisted (i.e., temporarily stored) and instead may be cleared on operating system reboots or when the remote provider for the current user has changed or when the remote provider resets the UserData. In this regard, the remote provider may check if UserData is set before proceeding to further aspects of the autofilling processes, an example of which is illustrated below:

```
if (autofillManager.getUserDataId( ) == null) {
    autofillManager.setUserData(...)
}
```

In still other embodiments, the remote provider may also use the id for versioning, an example of which is illustrated below:

```
if (!myCurrentId.equals(autofillManager.getUserDataId( ))) {
    autofillManager.setUserData(...)
}
```

Turning to the second point, a field classification request 314 may also be provided by the remote provider in furtherance of facilitating the autofilling of the application for which the operating system sent autofill request 308 for the same or different users. In this example, the field classification request is shown as "autofillId1".

In the context of this embodiment, the remote provider may explicitly request field classification in a FillResponse object, specifying in which fields this object should be used, an example of which is illustrated below:

```
fillcallback.onSuccess(new FillResponse.Builder( )
    .setFieldClassificationIds(autofillId1)
    .build( ));
```

In a further aspect, when the autofill context is committed, the operating system may verify if either of the two suggested user values provided by the remote provider (shown here as "felipe@x.com" and "LemeF") match any of the values the user manually enters for the indicated field classification request (shown here as "autofillId1"). But again, because the operating system does not want to be overwhelmed with any brute force attempts by the remote provider to identify the best ways to suggest autofill values, the operating system may curtail excessive amounts of suggested user values or field classification requests sent by the remote provider through a number of tactics, as presented in greater detail above.

Figure 3B:
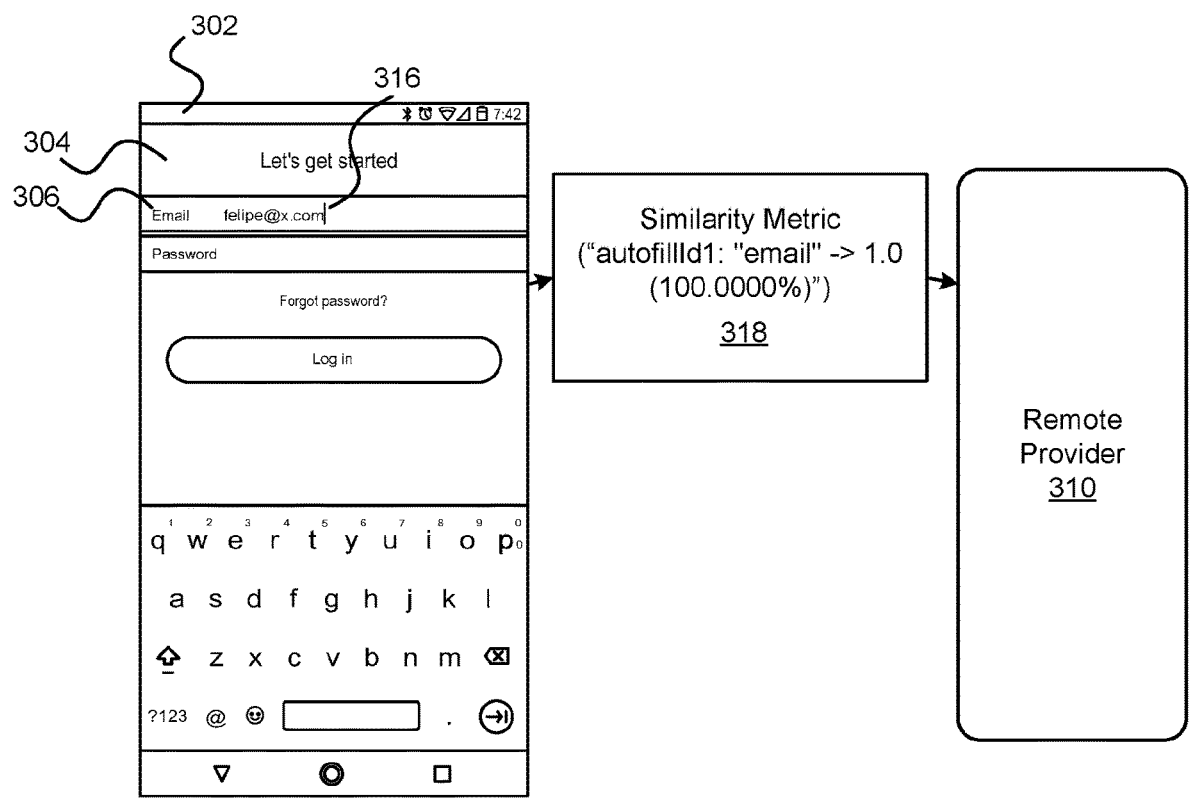
FIG. 3B shows manual user entry of data into a text input field of the application on the first mobile device and the operating system generating and sending one or more similarity metrics to the remote provider based on the user inputted data, in accordance with example embodiments.

Turning to FIG. 3B, FIG. 3B shows a first user's manual entry of data into a text input field of the application on the first mobile device. Additionally, FIG. 3B shows the resultant generating and sending of one or more similarity metrics to the remote provider by the operating system based on the user inputted data.

Particularly, FIG. 3B shows that the user may manually enter a user input value 316 (here, "felipe@x.com") into the first text input field 306 (here, the "Email" text input field). In response, the operating system may detect user input value 316 in text input field 306 and begin determining a similarity metric for each of the one or more values of suggested user data 312 based on a comparison of this user input value 316 to each of the one or more values. In this regard, the operating system may analyze and score user-inputted data without storing the user-inputted data on the user device, which in turn may assist remote provider 310 in its future autofilling efforts (both in the context of application 304 running on user device 302 or on a different user device).

In particular, in the context of this embodiment, the remote provider may verify the results of this process by using an existing FillEventHistory mechanism. The FillEventHistory is an API that allows the remote provider to inquire the operating system about events that happened in a previous autofill session. Events of type TYPE_CONTEXT_COMMITTED represents events where the user submitted (committed) a screen. If the service provider requested field classification on that screen and the request was accepted, the results are then available in the FillEventHistory object. The remote provider may also verify results by calling getFieldsClassification( ) which may return a map of FieldClassification objects keyed by identifiers such as "autofillId1". These identifiers (e.g., sequential identifiers) may be provided by an operating system to identify views, and the remote provider may use the identifiers to tell the operating system which views for which the remote provider is requesting field classification.

In a further aspect, the FieldClassification object may also contain Match objects that may represent which text input field (identified by its fieldId) match the autofilled id, which in turn may also contain a score telling how accurate the match was (e.g., the score is the highest score of all user values associated with the text input field id). For example, if the user entered "felipe@x.com" in the "autofillId1" field the result returned by the operating system may be represented in the following example:

```
Map<AutofillId, FieldClassification> results =
fillEvent.getFieldsClassification( );
for (auto entry : results.entrySet( ) {
    AutofillId id = entry.getKey( );
    FieldClassification fc = entry.getValue( );
    System.out.println(id + ": " + fc.getMatches( ));
}
// Output:
// autofillId1: "email" –> 1.0 (100.0000%)
```

Put another way, in this example, the score of the "autofillId1" field was a 100% match with the user value corresponding field_id "email" (i.e., the user input value 316, "felipe@x.com" entered by the user, matched completely with the "felipe@x.com" presented in the suggested user data 312 and field classification request 314).

In a further aspect, although the method and algorithm used to define the match score may be defined by UserData.Builder.setFieldClassificationAlgorithm( ) method, which takes the name of the algorithm and optional arguments, a default algorithm may also be used, particularly if unspecified by the remote provider.

In yet a further aspect, the operating system may generate and transmit a response to the field classification request 314 to remote provider 310, wherein the response comprises the similarity metric 318, and wherein remote provider 310 may utilize similarity metric 318 to improve future autofilling for the application.

Figure 4A:
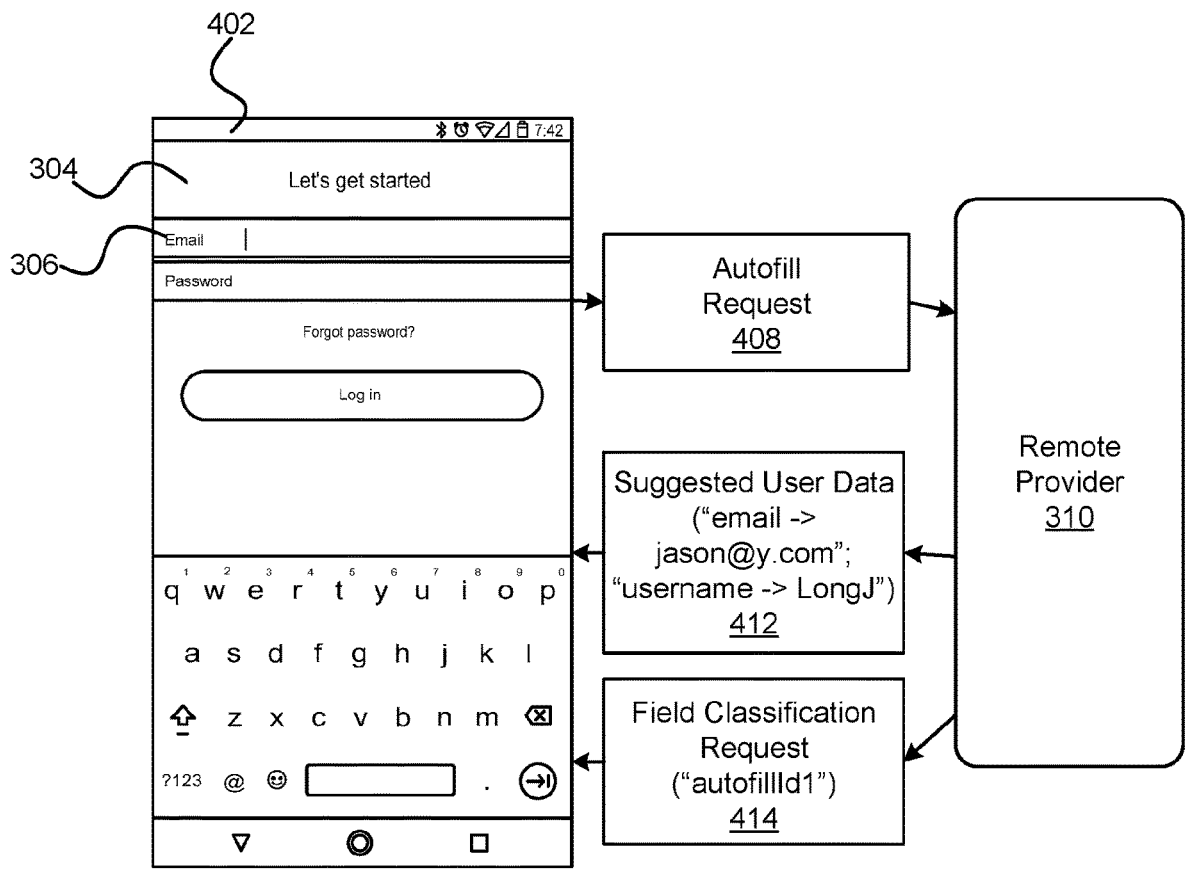
FIG. 4A shows an operating system of second mobile device sending an autofill request to the remote provider and receiving suggested user data and a field classification request from the remote provider, in accordance with example embodiments.

Similar to FIG. 3A, FIG. 4A, based on a second user's interaction with the application on a second mobile device, shows an operating system sending an autofill request to the remote provider and receiving one or more suggested user values and a field classification request from the remote provider, in accordance with example embodiments. In particular, a user device 402 (like user device 302) may display a portion of an application 304 on user device 402. Application 304 may also include text input fields containing or associated with a common autofill descriptors 306 (e.g., "Email") displayed on the UI of user device 402.

Like FIG. 3A, the operating system in FIG. 4A generates and transmits this autofill request (illustrated here as autofill request 408, and comprising the subset of content displayed on the UI) to the remote provider. Also like FIG. 3A, the operating system in FIG. 4A may be provided with at least two pieces of information from remote provider: (1) suggested user data 412 (shown here as "jason@y.com" and "LongJ"); and (2) a field classification request 414 (shown here as "autofillId1").

Figure 4B:
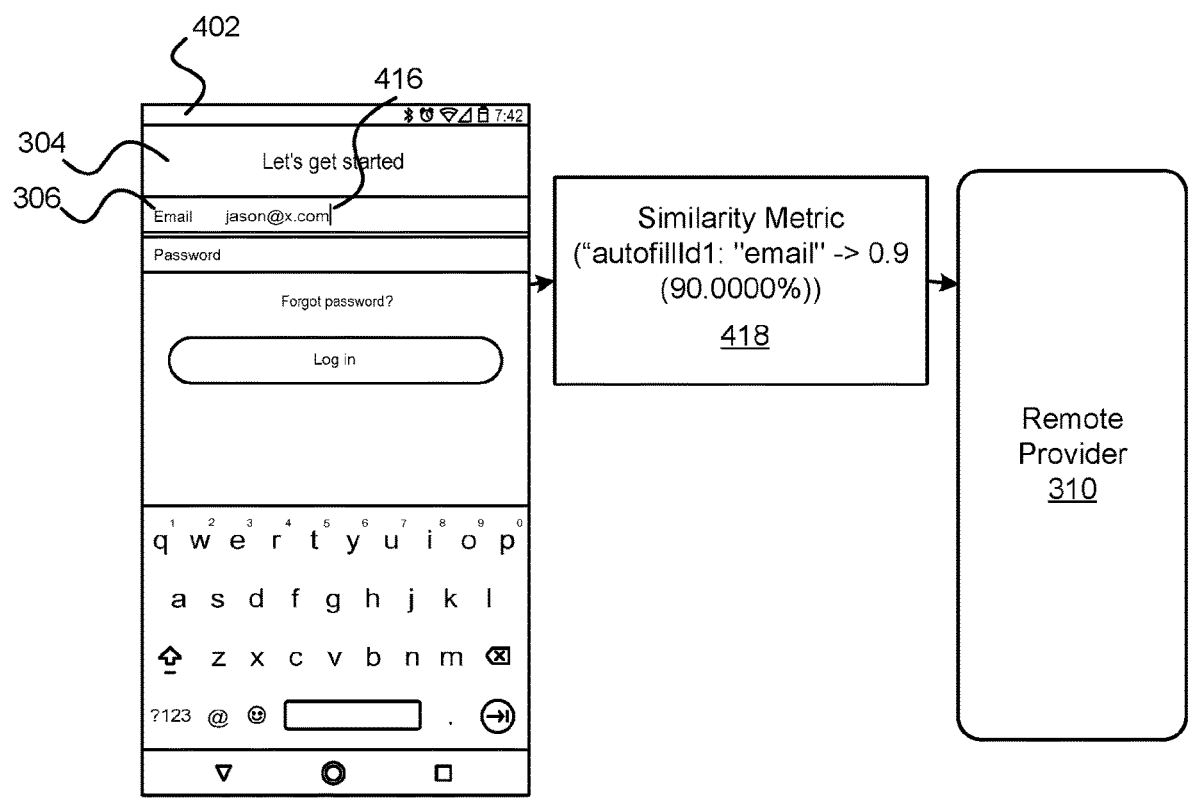
FIG. 4B shows manual user entry of data into a text input field of the application on the second mobile device and the operating system generating and sending one or more similarity metrics to the remote provider based on the user inputted data, in accordance with example embodiments.

Turning to FIG. 4B, a second user's manual entry of data into a text input field of the application on the first mobile device is shown. Like FIG. 3B, FIG. 4B shows that the user may manually enter a user input value 416 (here, "jason@x.com") into the first text input field 306 (here, the "Email" text input field). Like in FIG. 3B, in response to detecting user input value 416 in text input field 306 the operating system may begin determining a similarity metric for each of the one or more values of suggested user data 412 based on a comparison of this user input value 416 to each of these values.

And again, in this regard, the operating system may analyze and score user-inputted data without storing the user-inputted data on the user device, which in turn may assist remote provider 310 in its future autofilling endeavors (both in the context of application 304 running on user device 302, on user device 402, or on a different user device).

Unlike FIG. 3B, however, the score of the "autofillId1" field in the context of suggested user data 412 and user input value 416 would produce a 90% score (i.e., the "jason@x.com" entered by the user, 416, matches only 90% with the "jason@y.com" presented in the user suggested data 412 and field classification request 414).

Additionally, just as in FIG. 3B, the operating system in FIG. 4B may generate and transmit a response to the field classification request 414 to remote provider 310, wherein the response may comprise similarity metric 418, and wherein remote provider 310 may utilize at least similarity metrics 318 and 418 to better provide autofilling services for application 304. In this manner, example embodiments leverage crowdsourcing with user input data from multiple users to quickly train a remote provider to understand the fields of an application, while not compromising any sensitive user information without user consent. Further in this regard, for the remote provider to have suggested user values to suggest to the user, the remote provider must have obtained the user's consent previously. Accordingly, the present embodiments are not directed to the operating system assisting an unknown or random remote provider without user consent.

Figure 5:
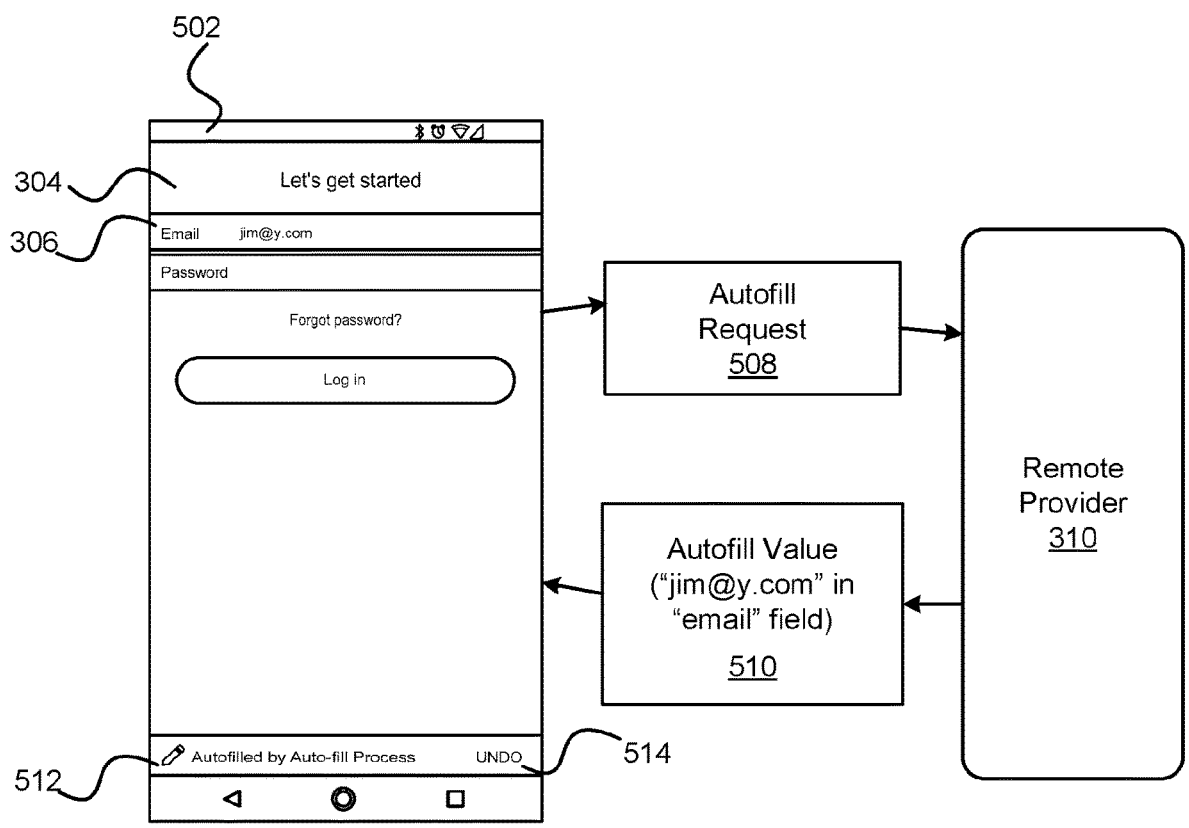
FIG. 5 shows an operating system of a third user device sending an autofill request to the remote provider and receiving and displaying an autofill value from the remote provider, in accordance with example embodiments.

Similar to FIGS. 3A and 4A, FIG. 5, based on a third user's interaction with the application on a third mobile device, shows an operating system sending an autofill request to the remote provider, in accordance with example embodiments. In particular, a user device 502 (like user devices 302 and 402) may display a portion of an application 304 on user device 502. Similarly, application 304 may also include text input fields containing or associated with a common autofill descriptors 306 (e.g., "Email") displayed on the UI of user device 502.

Turning to FIG. 5, the operating system may generate and transmit an autofill request (illustrated here as 508, and comprising the subset of content displayed on the UI), again to remote provider 310. Unlike the example embodiments in FIGS. 3A and 4A, however, the operating system in the example embodiment of FIG. 5 may not presented one or more suggested user values or a field classification request, but instead may be presented with an autofill value (shown here as "jim@y.com" for the "email" field), which it may then autofill into text input field 306.

Specifically, in this example embodiment, because remote provider 310 may have had, at least, the benefit of two operating systems' similarity metrics (318 and 418), it may have built the confidence to suggest an autofill value 510 containing both a specific suggested user value (here, "jim@y.com"), as well as specific text input field into which that value should be inputted (here, the "email" field). Thus, the result in this embodiment is that the operating system of user device 502 has securely leveraged the efforts and analysis of the operating systems of user devices 302 and 402, as well as remote provider 310, all without compromising the specific user content of user device 302, 402, or 502.

In a further aspect, in FIG. 5 the operating system may also display a confirmation message 512 to apprise the user that the text input fields of the application displayed on the UI have been autofilled. In a further example the operating system may also display an undo prompt 514 to apprise the user that the text input fields of the application may be cleared of the data filled by the operating system during the autofill process.

VI. Additional Concerns and Proposed Solutions

In some further aspects, however, because the burden of performing the autofill processes may be substantial, the overall performance of the operating system may be affected, perhaps even negatively. In one of the examples discussed above, the Field Classification feature may have a negative impact on the user device's health and performance for one or more of the following reasons: (1) When the remote provider cannot autofill an activity and returns a null response, the operating system may temporarily disable autofill for that activity; but if the remote provider sets the field classification instead of returning null, the session may be kept open; (2) the operating may keep the user's input values in memory; (2) the operating system may compute the field classification matches on commit, and then may send the matches to the remote provider, which in turn could be a O(N×M) operation (and data structure), where N is the number of user input value entries, and M is the number of classifiable fields.

To mitigate the overall performance impact on the operating system, one or more of the following mitigating actions may be adopted by the operating system during the autofilling process: (1) limit the overall number of suggested user values based on a predetermined maximum total number of suggested user values (e.g., the interface would not allow any more than ten suggested user values from any one remote provider); (2) limit the number of suggested user values for each text input field to a predetermined maximum per-field number of suggested user values (e.g., the interface would not allow any more than three suggested user values per text input field); (3) limit characteristics of the suggested user values themselves, based on one or more traits or characteristics of the suggested user value (e.g., a predetermined minimum number of characters, each of the one or more suggested user values to a first predetermined minimum number of characters if the suggested user value includes only numeric characters and to a second predetermined minimum number of characters if the suggested user value includes at least one non-numeric character); (4) limit the overall number of field classification requests based on a predetermined maximum total number of field classification requests (e.g., the interface would not allow any more than ten field classification requests from any one remote provider); limit the frequency at which the remote provider is providing field classification requests (e.g., the interface would not allow any more than ten field classification requests per hour from any one remote provider); (5) limit the number of field classification requests based on the number of user input fields (e.g., the interface would not allow any more than ten field classification requests on there being only two user input fields); (6) limit the number of field classification requests for each text input field to a predetermined maximum per-field number of field classification requests (e.g., the interface would not allow any more than three field classification requests per text input field); (7) optimize workflow when the response only has field classification (e.g., the null response scenario described above).

In a further aspect, under these scenarios, the remote provider may also check the maximum values accepted by communicating with or through a host of different or related services (e.g., UserData.getMaxFieldsSize( ), UserData.getMaxUserDataSize( ) UserData.getMaxFieldClassificationIdsSize( ) and UserData.getMaxValueLength( )). These values may also be defined by user settings, adjusted on the fly by a remote server, or set by other methods. Similarly, the remote provider may also call AutofillManager.isFieldClassificationEnabled( ) to check whether the feature is available at all (e.g., it may have been automatically disabled the operating system due to rate-limit violation, etc.).

Under any of these scenarios, however, the remote provider may not comply with the expectations of the operating system or the limitations of the interface, and, in the interest of its own preservation, the operating system may respond accordingly. For example, the operating system may have a predetermined allocation of its resources devoted to the processes described herein, or any portion thereof (e.g., the operating system may have a predetermined system resource allocation of 5% for receiving suggested user values and field classification requests from remote providers). Further, in some examples, if the operating system determines that this predetermined resource allocation has been exceeded, it may take ameliorative action (e.g., in response to determining its predetermined resource allocation of 5% has been exceeded, the operating system may refuse receipt of any further suggested user values or field classifications from the remote providers).

In yet a further aspect, security may be a concern for the user because of the operating system's analysis and scoring of user data in the autofilling process. Again, although the operating system may not directly tell the remote provider the values entered by the user, the remote provider may, through the use of persistent brute force, attempt to or figure out these values.

In one example, a remote provider could send a list of common pin codes (e.g., pin1={1111}, pin2={0000}, pin3={1234}, etc.) and suggested user values, and then get a confirmation when one of these values matches 100%. Furthermore, in this regard, if the remote provider were to iteratively perform this process for lots of users (e.g., thousands of users), eventually the remote provider may find matches. To mitigate any risk of this "brute-force" attack, in some embodiments, the operating system may undertake one or more of the protective efforts detailed above.

In a further aspect, in some embodiments, the operating system may also mitigate these concerns in a number of other ways (e.g., by limiting the number of fields that could be add to the UserData (through UserData.getMaxFieldSize( )), setting the minimum number of characters (through UserData.getMinValueLength( )), etc.), at various levels of specificity (e.g. limiting these values to 10 and 3, respectively). Finally, since the UserData described above may contain PII, it may be further protected through a number of additional measures (e.g., it may be kept in memory only (i.e., it won't be persisted on disk when the device reboots), its values won't be logged (on toString( ), dump( ), log( ), etc.)).

VII. Computing Device

Figure 6:
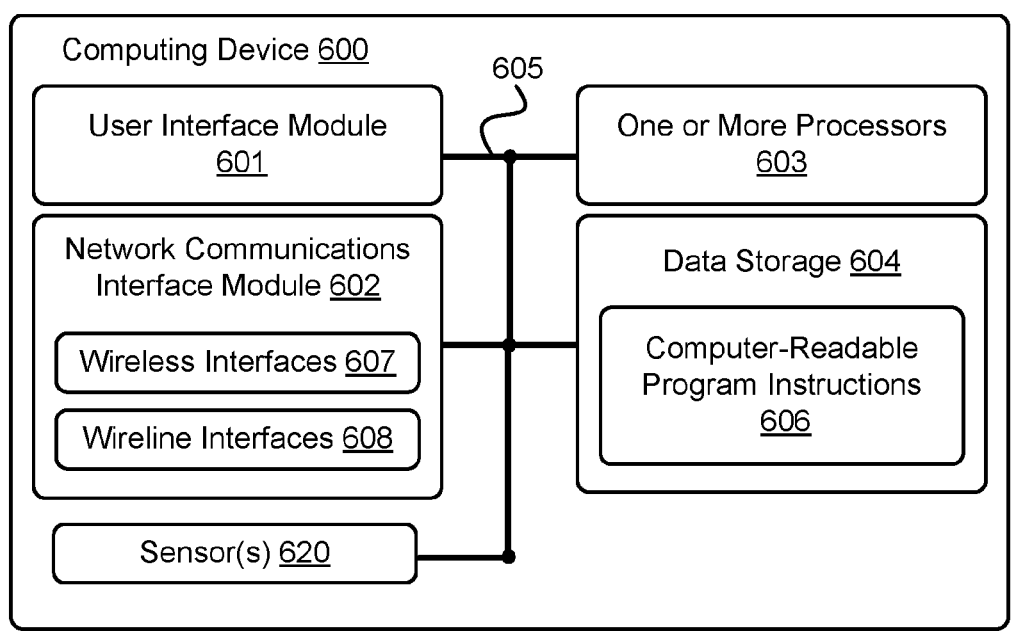
FIG. 6 is a functional block diagram of an example computing device, in accordance with example embodiments.

In reference now to FIG. 6, FIG. 6 is a functional block diagram of computing device 600, in accordance with example embodiments. In particular, computing device 600 shown in FIG. 6 can be configured to perform at least one function of server device 108 and/or 110, and/or remote provider 112 and/or 114, any of user device 104*a*-104*e*, method 200, user device 302, user device 402, and/or user device 502 as previously described.

Computing device 600 may include a user interface module 601, a network-communication interface module 602, one or more processors 603, data storage 604, and one or more sensors 620, all of which may be linked together via a system bus, network, or other connection mechanism 605.

User interface module 601 can be operable to send data to and/or receive data from external user input/output devices. For example, user interface module 601 can be configured to send and/or receive data to and/or from user input devices such as a keyboard, a keypad, a touch screen, a presence-sensitive display, a computer mouse, a track ball, a joystick, a camera, a voice recognition module, and/or other similar devices. User interface module 601 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 601 can also be configured to generate audible output(s), such as a speaker, speaker jack, audio output port, audio output device, earphones, and/or other similar devices. User interface module 601 can further be configured with one or more haptic devices that can generate haptic output(s), such as vibrations and/or other outputs detectable by touch and/or physical contact with computing device 600. In some embodiments, user interface module 601 can be used to provide a GUI for utilizing computing device 600.

Network-communications interface module 602 can include one or more wireless interfaces 607 and/or one or more wireline interfaces 608 that are configurable to communicate via a network. Wireless interfaces 607 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 602 can be configured to provide reliable, secured, and/or authenticated communications. For each communication, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

One or more processors 603 can include one or more general purpose processors, and/or one or more special purpose processors (e.g., digital signal processors, graphics processing units, application specific integrated circuits, etc.). One or more processors 603 can be configured to execute computer-readable program instructions 606 that are contained in data storage 604 and/or other instructions as described herein.

Data storage 604 can include one or more computer-readable storage media that can be read and/or accessed by at least one of one or more processors 603. The one or more computer-readable storage media can include volatile and/or non-volatile storage components, such as optical, magnetic, organic or other memory or disc storage, which can be integrated in whole or in part with at least one of one or more processors 603. In some embodiments, data storage 604 can be implemented using a single physical device (e.g., one optical, magnetic, organic or other memory or disc storage unit), while in other embodiments, data storage 604 can be implemented using two or more physical devices.

Data storage 604 can include computer-readable program instructions 606 and perhaps additional data. In some embodiments, data storage 604 can additionally include storage required to perform at least part of the herein-described methods, scenarios, and techniques and/or at least part of the functionality of the herein-described devices and networks.

In some embodiments, computing device 600 can include one or more sensors 620. Sensor(s) 620 can be configured to measure conditions in an environment of computing device 600 and provide data about that environment. For example, sensor(s) 620 can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) sensors to measure locations and/or movements of computing device 600, such as, but not limited to, a tilt sensor, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 600, such as, but not limited to, an infrared sensor, an optical sensor, a light sensor, a camera, a biosensor, a biometric sensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about computing device 600, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 620 are possible as well.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compactdisc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A method comprising:
    determining a subset of content displayed by an application on a user interface (UI) of a user device, wherein the subset excludes user-specific information;
    transmitting, to a remote provider, an autofill request for the application, wherein the autofill request comprises the subset of content displayed on the UI;
    receiving, from the remote provider in response to the autofill request, one or more suggested user values and a field classification request for a text input field displayed by the application on the UI;
    detecting a user input value in the text input field;
    in response to detecting the user input value in the text input field, determining a similarity metric for each of the one or more suggested user values based on a comparison of the user input value to each of the one or more suggested user values; and
    transmitting a response to the field classification request to the remote provider, wherein the response comprises the similarity metric for at least one of the one or more suggested user values.

2. The method of claim 1, wherein determining the similarity metric for each of the one or more suggested user values comprises applying an underlying comparison model, wherein the underlying comparison model is updatable between autofill requests.

3. The method of claim 1, further comprising:
    transmitting, to the remote provider, a list of underlying comparison models; and
    receiving, from the remote provider, a selected underlying comparison model from the list of underlying comparison models, wherein determining the similarity metric for each of the one or more suggested user values comprises applying the selected underlying comparison model.

4. The method of claim 1, wherein determining the similarity metric for each of the one or more suggested user values comprises applying an edit distance model.

5. The method of claim 1, wherein the one or more suggested user values comprise a plurality of suggested user values, and wherein the response comprises the similarity metric for a best matching user value from the plurality of suggested user values.

6. The method of claim 1, wherein the one or more suggested user values comprise a plurality of suggested user values, and wherein the response comprises the similarity metric for each of the plurality of suggested user values.

7. The method of claim 1, wherein the field classification request further indicates an additional text input field, the method further comprising:
    detecting an additional user input value in the additional text input field;
    in response to detecting the additional user input value in the additional text input field, determining an additional similarity metric for each of the one or more suggested user values based on a comparison of the additional user input value to each of the one or more suggested user values; and
    transmitting an additional response to the remote provider, wherein the additional response comprises the additional similarity metric for at least one of the one or more suggested user values.

8. The method of claim 1, wherein the field classification request further indicates an additional text input field, the method further comprising:
    receiving, from the remote provider in response to the autofill request, one or more additional suggested values, wherein the one or more additional suggested values are different than the one or more suggested user values;
    detecting an additional user input value in the additional text input field;
    in response to detecting the additional user input value in the additional text input field, determining an additional similarity metric for each of the one or more additional suggested values based on a comparison of the additional user input value to each of the one or more additional suggested values; and
    transmitting an additional response to the remote provider, wherein the additional response comprises the additional similarity metric for at least one of the one or more additional suggested values.

9. The method of claim 1, wherein the one or more suggested user values are received via an interface that limits a total number of suggested user values to a predetermined maximum total number of suggested user values.

10. The method of claim 1, wherein the one or more suggested user values are received via an interface that limits a number of suggested user values for each text input field to a predetermined maximum per-field number of suggested user values.

11. The method of claim 1, wherein the one or more suggested user values are received via an interface that limits each of the one or more suggested user values to a predetermined minimum number of characters.

12. The method of claim 1, wherein the one or more suggested user values are received via an interface that limits each of the one or more suggested user values to a first predetermined minimum number of characters if the suggested user value includes only numeric characters and to a second predetermined minimum number of characters if the suggested user value includes at least one non-numeric character.

13. The method of claim 1, wherein the field classification request is received via an interface that limits a number of user input fields for the field classification request to a predetermined maximum number of user input fields.

14. The method of claim 1, wherein the field classification request is received via an interface that limits a frequency of field classification requests for the application by the remote provider to a predetermined maximum frequency.

15. The method of claim 1, wherein the field classification request is received via an interface that limits a total number of field classification requests for the application by the remote provider to a predetermined maximum total number of field classification requests.

16. The method of claim 1, wherein the field classification request is received via an interface that limits a number of field classification requests for each text input field of the application by the remote provider to a maximum per-field number of field classification requests.

17. The method of claim 1, further comprising:
receiving, from the remote provider in response to the autofill request, an autofill value for an additional text input field displayed by the application; and
in response to receiving the autofill value, causing the autofill value to be displayed in the additional text input field.

18. The method of claim 1, further comprising:
determining that a predetermined operating system resource allocation has been exceeded; and
in response to determining the predetermined operating system resource allocation has been exceeded, refusing receipt of any further suggested user values or field classification requests from the remote provider.

19. The method of claim 1, further comprising:
temporarily storing a cached object comprising the one or more suggested user values; and
using the cached object to satisfy one or more subsequent field classification requests received from the remote provider for the application.

20. A user device comprising:
a user interface (UI); and
an operating system configured to:
determine a subset of content displayed by an application on the UI of the user device, wherein the subset excludes user-specific information;
transmit, to a remote provider, an autofill request for the application, wherein the autofill request comprises the subset of content displayed on the UI;
receive, from the remote provider in response to the autofill request, one or more suggested user values and a field classification request for a text input field displayed by the application on the UI;
detect a user input value in the text input field;
in response to detecting the user input value in the text input field, determine a similarity metric for each of the one or more suggested user values based on a comparison of the user input value to each of the one or more suggested user values; and
transmit a response to the field classification request to the remote provider, wherein the response comprises the similarity metric for at least one of the one or more suggested user values.

21. A non-transitory computer readable medium having stored therein instructions executable by one or more processors to cause the one or more processors to perform functions comprising:
determining a subset of content displayed by an application on a user interface (UI) of a user device, wherein the subset excludes user-specific information;
transmitting, to a remote provider, an autofill request for the application, wherein the autofill request comprises the subset of content displayed on the UI;
receiving, from the remote provider in response to the autofill request, one or more suggested user values and a field classification request for a text input field displayed by the application on the UI;
detecting a user input value in the text input field;
in response to detecting the user input value in the text input field, determining a similarity metric for each of the one or more suggested user values based on a comparison of the user input value to each of the one or more suggested user values; and
transmitting a response to the field classification request to the remote provider, wherein the response comprises the similarity metric for at least one of the one or more suggested user values.

\* \* \* \* \*